3,408,377
PROCESS FOR THE PRODUCTION OF ALUMINUM
ALKYL COMPOUNDS FROM ALPHA-OLEFINS,
METALLIC ALUMINUM AND HYDROGEN
Maria Jadwiga Jarzynska, Gorska St. 34,
m. 53, Warsaw, Poland
No Drawing. Filed Aug. 24, 1964, Ser. No. 391,784
2 Claims. (Cl. 260—448)

ABSTRACT OF THE DISCLOSURE

A process for producing aluminum trialkyl compounds comprising reacting aluminum, trialkyl aluminum compound and hydrogen to produce a dialkyl aluminum which is reacted with alpha-olefin to produce trialkyl aluminum compound. The reactions are carried out in the presence of one or more of alumina, magnesia, silica or aluminosilicate compounds.

---

The present invention relates to a process for the production, directly from alpha-olefins, metallic aluminum and hydrogen, of aluminum alkyl compounds which may be applied in industry as components of catalysts for polymerization of olefins, as semi-finished products for many organic syntheses, as additions to rocket fuel propellants, as selective reducing substances etc.

The methods hitherto described in previous patents, particularly in those of Professor Ziegler, consist in that the synthesis of aluminum alkyl compounds is conducted under high pressures of 10 to 300 atm. and at high temperatures, pulverized aluminum being activated before or during the reaction by means of aluminum alkyl chlorides or aluminum alkyls. Practically, according to those methods, the synthesis of aluminum alkyl compounds is conducted at temperatures of from 70 to 140° C., under a pressure of about 200 atm., and generally it is conducted in two stages.

In the first stage, requiring especially high pressure and an excess amount of hydrogen, compounds of dialkylaluminumhydride are obtained, according to the equation:

(I) 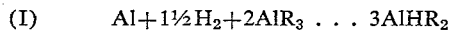

In the second stage, under milder conditions the following reaction takes place:

(II) 

where R stands for an alkyl group, and R' stands for an alkenyl group.

The disadvantage of the foregoing methods lies in the necessity of applying a high pressure, at least in one of the stages.

In the course of investigations which have been made for elimination of high pressure, it has been found that aluminum alkyl compounds can be obtained directly from alpha-olefins, aluminum and hydrogen under normal pressure or under a pressure raised up to 10 atm., when the synthesis is conducted in the presence of substances having a developed surface, especially alumina, silica, magnesia or aluminosilicates. This reaction can also be conducted under higher pressure, but the further shortening of the duration of the reaction connected therewith is relatively small and hence unprofitable.

According to the present invention, the synthesis of aluminum alkyl compounds is conducted periodically or continuously in one or two stages, depending on the kind of the used olefin. This invention relates in principle to the first stage of the reaction which is carried out under normal pressure or under pressure elevated up to 10 atm., the second stage being conducted in a known way, under milder conditions. When the reaction is conducted in one step, pressures characteristic for the first stage are used.

According to the invention, the process of obtaining aluminum alkyl compounds can be carried out in the presence of aliphatic or aromatic hydrocarbon solvents as well as without such solvents. The reaction also takes place when reagents of technical purity are used.

Example I 50 g. of activated aluminum, 4.5 g. of $Al_2O_3$ and 634 g. of aluminum triisobutyl are brought into a rotating, periodically acting autoclave in the atmosphere of nitrogen, and the contents of the autoclave is heated to a temperature of 100° C. Then a stoichiometric amount of hydrogen, that is 55 litres, is gradually and continuously introduced in a way as to avoid in the autoclave a pressure of more than 10 atm. After 6 hours the hydrogen is reacted quantitatively with aluminum triisobutyl into diisobutyl aluminum hydride in consequence of which a slight underpressure is to be found in the autoclave. Thereupon 270 g. of isobutylene is introduced into the autoclave and the autoclave is heated to a temperature of 70° C. for 4 hours. 930 g. of aluminum triisobutyl is obtained.

Example II 2.5 g. of $Al_2O_3$, 28 g. of aluminum, 114 g. of aluminum triethyl and hydrogen to a pressure of 10 atm. are brought into a rotating, periodically acting autoclave. The temperature in the autoclave is maintained in the range of from 125 to 135° C. As the reaction proceeds, the pressure of hydrogen is being restored so as to be maintained within the limits of 8 to 10 atm. After 3.5 hours the pressure of hydrogen is stabilized and the reaction is finished. 128 g. of aluminum diethyl hydride is obtained. The transformation of aluminum diethyl hydride into aluminum triethyls is conducted further in the known way.

Example III

Into an autoclave containing 81 g. of activated aluminum, 5 g. of silica and 100 g. of aluminum triisobutyl, an amount of 385 g. of isobutylene is introduced, the autoclave is heated and maintained at a temperature of from 110 to 125° C. Thereupon hydrogen is being dosed in such a way that the pressure in the autoclave is maintained below 9 atm. After 8 hours pure aluminum triisobutyl is obtained with a yield of 63% in relation to isobutylene used.

Example IV 50 g. of activated aluminum, 4 g. of magnesia and 270 g. of aluminum triisobutyl are introduced into an autoclave. The autoclave is heated to a temperature of from 115 to 120° C. and hydrogen is introduced to obtain a pressure of 9 atm. In the course of the reaction the pressure falls down. It is periodically restored by introducing fresh hydrogen. After the reaction of the required amount of hydrogen, the pressure in the autoclave after cooling amounts to 2 atm. The reaction time is 6 hours. The yield of aluminum diisobutylhydride is 74%.

Example V 108 g. of activated aluminum, 9 g. of roasted aluminosilicagel, 670 g. of aluminum triisobutyl and hydrogen to pressure of 10 atm. are introduced into a rotating autoclave. The autoclave is heated to a temperature of 115° C., whereupon, when the pressure falls, it is restored with hydrogen in such a way that it does not exceed the initial pressure. After 6 hours the pressure drop in the autoclave is stopped, and after cooling it amounts to 4.5 atm. In the product, aluminum diisobutylhydride is obtained with a yield of 95% in relation to aluminum triisobutylhydride used.

What I claim as new and desire to secure by Letters Patent of the United States is:

1. Process for producing aluminum trialkyl compounds comprising reacting in a first stage aluminum, a quantity of lower trialkyl aluminum compound and hydrogen in the presence of a substance selected from the group consisting of alumina, magnesia, silica and aluminosilicate to produce dialkyl aluminum hydride then adding alpha-olefin hydrocarbon to react with the dialkyl aluminum hydride to produce a larger quantity of trialkyl aluminum compound than was employed in the first stage.

2. The process of claim 1 wherein the lower alkyl and alpha-olefin contain from 1 to 4 carbon atoms.

References Cited
UNITED STATES PATENTS

| | | | |
|---|---|---|---|
| 2,666,076 | 1/1954 | Rex et al. | 260—448 |
| 2,687,423 | 8/1954 | Mesirow | 260—448 |
| 2,873,290 | 2/1959 | Esmay | 260—448 |
| 3,032,574 | 5/1962 | Ziegler et al. | 260—448 |
| 3,046,290 | 7/1962 | Podall | 260—448 |
| 3,100,786 | 8/1963 | Fernald | 260—448 |

TOBIAS E. LEVOW, *Primary Examiner.*

H. M. S. SNEED, *Assistant Examiner.*